S. W. FRANSSON.
COMBINATION DIGGING TOOL.
APPLICATION FILED AUG. 22, 1916.
1,250,839.
Patented Dec. 18, 1917.
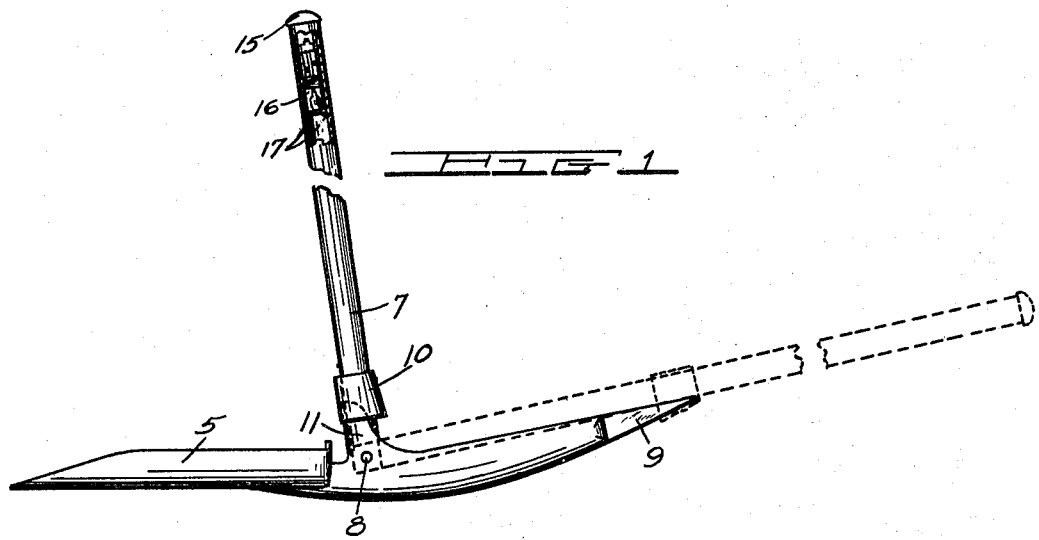
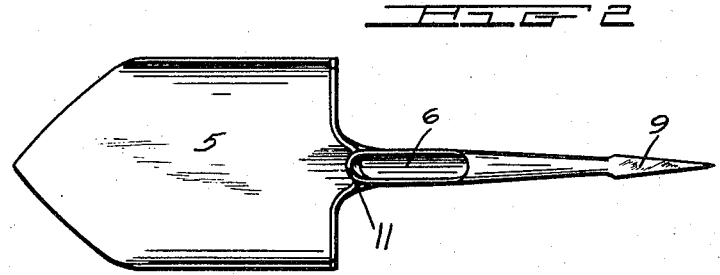
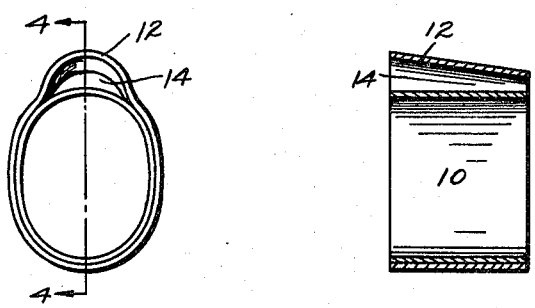
Inventor
S. W. FRANSSON.
By his Attorney

UNITED STATES PATENT OFFICE.

SVEN W. FRANSSON, OF BROOKLYN, NEW YORK.

COMBINATION DIGGING-TOOL.

1,250,839.   Specification of Letters Patent.   Patented Dec. 18, 1917.

Application filed August 22, 1916. Serial No. 116,394.

*To all whom it may concern:*

Be it known that I, SVEN W. FRANSSON, a citizen of the United States, and resident of Brooklyn, in the county of Kings and State of New York, have invented certain new and useful Improvements in Combination Digging-Tools, of which the following is a specification.

This invention relates to combination digging tools, and one of the principal objects of the invention is to provide simple, reliable and easily portable means for digging operations such as garden or trench work.

Another object of the invention is to provide a combination digging tool comprising a spade, shovel, hoe and pick, the tool being conveniently adapted to be used in either capacity with approximately the same efficiency as an individual implement of that particular character.

Still another object of the invention is to provide a combination digging tool in which the digging portion consists of a spade, shovel or hoe oppositely disposed to a pick, there being a pivoted handle attached between the two digging portions.

A still further object of the invention is to provide, in such an implement, a sleeve to hold the tip of the pick when not used, in such a manner that the hands of the user may be protected therefrom, both as regards accidental cutting or pricking of the latter and getting soiled by the dirt that may attach to the tip of the pick from its former use.

These and other objects may be attained by means of the construction illustrated in the accompanying drawing, in which, Figure 1 is a general side view illustrating the method of adaptation. Fig. 2 is a plan view of the digging portion of the implement. Fig. 3 is an enlarged front view of the collar for securing the handle rigidly to the digging tool in either position. Fig. 4 is a sectional view of Fig. 3 on line 4—4.

Similar characters of reference refer to similar parts throughout the several views.

Referring to the drawing, the numeral 5 designates a spade or hoe of usual form to the upper central portion of which is formed the socket 6 to which the hollow handle 7 is pivoted at 8. The other end of the socket 6 is extended into the pick 9, the entire digging portion of the implement being practically constructed of a single piece of metal.

In order to use this implement in such manner that a hoe and pick are oppositely disposed at approximately right angles to handle 7, the collar 10 is tightly slipped over the tongue 11, thus rigidly holding the handle in the desired position in relation to the digging implements and incidentally providing a strong, durable and conveniently altered connection.

In this position, the implement is used either as a pick or a hoe.

When it is desired to transform the implement into a spade, the collar 10 is slipped from the tongue 11, the handle 7 then swung on the pivot 8 to the relative position shown by the dotted lines in Fig. 1 and the collar 10 slipped over the point of the pick 9. It will now be evident that the implement provides an excellent and strongly constructed spade, the handle 7 being securely held in position.

Referring more particularly to Fig. 3 and Fig. 4 it will be noted that the collar 10 is preferably constructed of two rings or bands of sheet metal, preferably welded together with the exception of a small portion of their circumference, the outer ring being raised at 12 thus forming the loop 14 into which the pick point 9 is adapted to enter when the handle is set in position to be used as a spade.

The handle 7 is preferably constructed of hollow sheet metal, the extreme end being provided with a removable cap or cover 15. Into the hollow handle may be slipped a "first aid" set 16, the container being prevented from entering the handle too far by means of the stops 17. It is understood that this combination digging implement is especially adapted for army use in digging trenches, in which case the spade portion 5 also forms an effective shield against rifle fire. This implement is equally well adapted for general garden use.

From the foregoing it will be obvious that a combination digging tool made in accordance with this invention is extremely simple in construction, may be quickly and conveniently set to be used either as a spade or a pick and hoe, the joint between handle and the digging implement being exceptionally strong in either position, while the cost of manufacture is very low.

Various changes may be made in the details of construction without departing from the spirit and scope of the invention as defined in the claim.

What is claimed is:—

A combination tool comprising, in combination, a tool member made of one piece of material, having one end formed into a pick and the other end into a shovel, the stem of said pick end being tubular, a hole cut in said tubular stem at about the longitudinal center of said tool member, a handle of elongated cross-section inserted into said hole and pivoted therein, a metallic sleeve closely fitting on said handle, slidably mounted thereon, a second sleeve mounted on said first mentioned sleeve, having one narrow end bulging out and forming a conical pocket between the said sleeves, a curved lip formed on said tool member, adapted partly to surround said handle when at right angles to said tool member and to be engaged by slipping said first mentioned sleeve over it, thereby holding firmly the tool member and the handle in the said position, and said pocket adapted to engage the pick end of said tool member when the latter is folded substantially parallel to said handle.

Signed at Brooklyn, in the county of Kings, and State of New York, this 21st day of August, A. D. 1916.

SVEN W. FRANSSON.

Witnesses:
AUGUST SVANSON,
ALEXANDER E. WILCOX.